US008603325B2

(12) United States Patent
Siskin et al.

(10) Patent No.: US 8,603,325 B2
(45) Date of Patent: *Dec. 10, 2013

(54) BIOMASS OIL CONVERSION PROCESS

(75) Inventors: Michael Siskin, Westfield, NJ (US);
Glen E. Phillips, Goldvein, VA (US);
Simon R. Kelemen, Annandale, NJ
(US); Walter Weissman, Basking Ridge,
NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/038,107

(22) Filed: Mar. 1, 2011

(65) Prior Publication Data

US 2011/0232164 A1    Sep. 29, 2011

Related U.S. Application Data

(60) Provisional application No. 61/317,582, filed on Mar. 25, 2010.

(51) Int. Cl.
*C10L 1/02* (2006.01)

(52) U.S. Cl.
USPC .......................................... 208/131; 208/132

(58) Field of Classification Search
USPC ................................................ 208/131–132
See application file for complete search history.

(56) References Cited

U.S. PATENT DOCUMENTS

| | | | |
|---|---|---|---|
| 3,689,240 | A | 9/1972 | Aldridge et al. |
| 4,337,142 | A | 6/1982 | Knudson et al. |
| 4,605,762 | A | 8/1986 | Mandoki |
| 5,151,173 | A | 9/1992 | Vaughn et al. |
| 5,338,442 | A | 8/1994 | Siskin et al. |
| 7,303,644 | B2 | 12/2007 | Kitabayashi et al. |
| 7,306,713 | B2 | 12/2007 | Siskin et al. |
| 7,374,665 | B2 | 5/2008 | Eppig et al. |
| 7,645,375 | B2 | 1/2010 | Varadaraj et al. |
| 7,658,838 | B2 | 2/2010 | Varadaraj et al. |
| 7,727,382 | B2 | 6/2010 | Sparks et al. |
| 2005/0263440 | A1 | 12/2005 | Varadaraj et al. |
| 2005/0269247 | A1 | 12/2005 | Sparks et al. |
| 2005/0279672 | A1 | 12/2005 | Varadaraj et al. |
| 2005/0279673 | A1 | 12/2005 | Eppig et al. |
| 2006/0060506 | A1 | 3/2006 | Siskin et al. |
| 2010/0024283 | A1* | 2/2010 | Portilho et al. ............. 44/307 |

OTHER PUBLICATIONS

Keenan et al., "CRC Handbook of Chemistry and Physics and Steam Tables", Wiley-Interscience, New York (1969).
Franck, "Fluids At High Pressures and Temperatures", Journal of Chemical Therrmodynamics, vol. 19, pp. 225-242 (1987).
Siskin et al., "Reactivity of Organic Compounds in Hot Water: Geochemical and Technological Implications", Science, Articles, vol. 254, pp. 231-237 (Oct. 11, 1991).
Siskin et al., "Asphaltene Molecular Structure and Chemical Influences on the Morphology of Coke Produced in Delayed Coking", Energy & Fuels, vol. 20, pp. 1227-1234 (2006).
Demirbas, "Thermochemical Conversion of Biomass to Liquid Products in the Aqueous Medium", Energy Sources, vol. 27, pp. 1235-1243 (2005).
Baltisberger et al., "Carbon Monoxide-Water vs. Hydrogen for Liquefaction: The Reduction of Diphenylsulfide, Thioanisole and Dibenzothiophene", Department of Chemistry, University of North Dakota, Grand Forks, ND 58202, pp. 74-79.
Breslow, "Hydrophobic Effects on Simple Organic Reations in Water", Accounts of Chemical Research, vol. 24, No. 6, pp. 159-164 (Jun. 1991).
Elliott et al., "Liquid Hydrocarbon Fuels From Biomass", American Chemical Society, Division of Fuel Chemistry, Preprints, vol. 34, No. 4, pp. 1160-1166 (1989).
Siskin et al., Aqueous Organic Chemistry, 5. Diaryl Ethers: Diphenyl Ether, 1-Phenoxynaphthalene and 9-Phenoxyphenanthrene, Fuel, vol. 72, No. 10, pp. 1435-1444 (1993).
Campbell et al., "Polyurethane Foam Recycling Superheated Steam Hydrolysis", Environmental Science & Technology, vol. 10, No. 2, pp. 182-185 (Feb. 1976).
Pitzer, "Dielectric Constant of Water At Very High Temperature and Pressure", Proceeding of the National Academy of Sciences USA, vol. 80, pp. 4575-4576 (1983).
Ringer et al., Large-Scale Pyrolysis Oil Production: a Technology Assessment and Economic Analyis, Technical Report NREL/TP-510-37779 (Nov. 2006).
Appell et al., "Coal Liquefaction With Synthesis Gas", Pittsburgh Energy Technology Center, Pittsburgh, Pennsylvania, (Sep. 1979).
Rocha et al., "The Scope for Generating Bio-Oils With Relatively Low Oxygen Contents Via Hydropyrolysis", Organic Geochemistry, vol. 30, pp. 1527-1534 (1999).
Matsumura et al., "Supercritical Water Treatment of Biomass for Energy and Material Recovery", Combustion Science and Technology, vol. 178, pp. 509-536, (2006).
Stenberg et al., "Carbon Monoxide-Hydrogen-Water: Reduction of Anthracene, Dihydroanthracene, and Quinoline", Journal of Organic Chemistry, vol. 43, No. 15, pp. 2991-2994 (1978).
Boocock et al., "The Liquefaction of Poplar by Rapid Aqueous Pyrolysis: Results From Semi-Continuous and Batch Units", Department of Chemical Engineering, University of Toronto, Toronto, Ontario, M5S 1A4, pp. 450-454.
Kinstle et al., "Chemical Intermediates From Scrap Polymers Via Hydrolysis", Department of Chemistry, University of Tennessee, Knoxville, TN 37996, pp. 446-447.

(Continued)

*Primary Examiner* — Brian McCaig
(74) *Attorney, Agent, or Firm* — Glenn T. Barrett; Malcolm D. Keen

(57) ABSTRACT

A biomass pyrolysis oil is used as a co-feed for a heavy petroleum oil coking process to improve the operation of the coking process and to utilize biomaterial for the production of transportation fuels. The coking process may be a delayed coking process or a fluidized bed coking process and in each case, the presence of the biomass pyrolysis oil will decrease the coke drying time while reducing coke handling problems in the unit besides forming a superior coke product. In the case of a fluidized bed coking process using a gasifier for the coke, the addition of an alkali metal salt improves the operation of the gasifier.

20 Claims, No Drawings

(56) References Cited

OTHER PUBLICATIONS

Akerlof et al., "The Dielectric Constant of Water At High Temperatures and in Equilibrium With Its Vapor", Koppers Company Research Fellowship, Mellon Institute and the Department of Physics, University of Pittsburgh, vol. 72, pp. 2844-2847 (Jul. 1950).

Scott et al., "The Continuous Flash Pyrolysis of Biomass", The Canadian Journal of Chemical Engineering, vol. 62, pp. 404-412 (Jun. 1984).

Davis et al., "The Chemistry and Stoichiometry of Wood Liquefaction", Biotechnology and Bioengineering Symposium, No. 11, pp. 151-169 (1981).

Schaleger et al., "Direct Liquefaction of Biomass: Results From Operation of Continuous Bench-Scale Unit in Liquefaction of Water Slurries of Douglas Fir Wood", Biotechnology and Bioengineering Symposium, No. 12, pp. 3-14 (1982).

Gregoire et al., "Technoeconomic Analysis of the Production of Biocrude From Wood", Biomass and Bioenergy, vol. 7, Nos. 1-6, pp. 275-283 (1994).

Ellis et a;., "Tutorial: Delayed Coking Fundamentals", Great Lakes Carbon Corporation, Prepared for presentation at AlChE 1998 Spring National Meeting, March 81-12, 1998.

\* cited by examiner

BIOMASS OIL CONVERSION PROCESS

CROSS REFERENCE TO RELATED APPLICATIONS

This application relates and claims priority to U.S. Provisional Patent Application No. 61/317,582, filed on Mar. 25, 2010. This application is also related to U.S. patent application Ser. No. 13/038,010 entitled "Biomass Oil Conversion Process", filed on Mar. 1, 2011, which claims priority to U.S. Provisional Patent Application No. 61/317/545 and co-pending U.S. patent application Ser. No. 12/828,405, filed on Jul. 1, 2010, which claims priority to U.S. Provisional Patent Application No. 61/270,595, filed on Jul. 10, 2009, which relates to the addition of alkali metal compounds to heavy oil feeds used in delayed coking processes.

FIELD OF THE INVENTION

The present invention relates to a process for the production of liquid transportation fuels by the conversion of biomass pyrolysis oils.

BACKGROUND OF THE INVENTION

Petroleum is currently estimated to account for over 35% of the world's total commercial primary energy consumption. Coal ranks second with 23% and natural gas third with 21%. The use of liquid hydrocarbon fuels on an enormous scale for transportation has led to the depletion of readily accessible petroleum reserves in politically stable regions and this, in turn, has focused attention, economically, technically and politically on the development of alternative sources of liquid transportation fuels. Liquid hydrocarbons are far and away the most convenient energy sources for transportation in view of their high volumetric energy. The energy density of gasoline, for example at about 9 kWh/liter and of road diesel at about 11 kWh/liter, far exceeds that of hydrogen (1.32 kWh/liter at 680 atm, or batteries, 175 Wh/kg. Furthermore, the liquid hydrocarbon fuel distribution infrastructure is efficient and already in place.

Production of liquid fuels from biomass can help solve the problem of $CO_2$ emission from the transportation sector because $CO_2$ released from vehicle exhaust is captured during biomass growth. While direct, carbon-neutral use of biomass as fuel is established, for example, biodiesel, this route is limited because the limited choice of source materials, e.g. vegetable oils. Conversion of a wider variety of biomass sources into more traditional types of fuel, principally hydrocarbons, is the more attractive option.

Currently, there are two major routes for conversion of biomass to liquid fuels: biological and thermo-chemical. In the biological process, fermentation of easily fermentable plant products, such as, for example, sugars to alcohols is achieved. These easily fermentable plant products can be extracted from corn kernels, sugar cane etc. The major disadvantage of this pathway is that only a fraction of the total carbon in biomass is converted to the final desired liquid fuel. It has been calculated that conversion of all corn produced in USA to ethanol can meet 12% of entire US demand for gasoline which reduces to 2.4% after accounting for fossil fuel input required to produce the ethanol.

One well-established route to the production of hydrocarbon liquids is the gasification of carbonaceous materials followed by the conversion of the produced synthesis gas to form liquids by processes such as Fischer-Tropsch and its variants. In this way, solid fuels such as coal and coke may be converted to liquids. Coal gasification is well-established, being used in many electric power plants and the basic process can proceed from just about any organic material, including biomass as well as waste materials such as paper, plastic and used rubber tires. Most importantly, in a time of unpredictable variations in the prices of electricity and fuels, gasification systems can provide a capability to operate on low-cost, widely-available coal reserves. Gasification may be one of the best ways to produce clean liquid fuels and chemical intermediates from coal as well as clean-burning hydrogen which also can be used to fuel power-generating turbines or used in the manufacture of a wide range of commercial products. Gasification is capable of operating on a wide variety of input materials, can be used to produce a wider variety of output fuels, and is an extremely efficient method of extracting energy from biomass. Biomass gasification is therefore technically and economically attractive as an energy source for a carbon constrained economy.

The conversion of biomass to hydrocarbon transportation fuels by the gasification-liquefaction sequence has, however, certain limitations both technically and economically. First, the conversion of the biomass to synthesis gas requires large process units, high in capital cost to deal with the enormous volumes of gas generated in the process. Second, the gas-to-liquid conversion uses catalysts which may, for optimum results, use noble metal components and accordingly be very expensive. Third, and by no means least is the fact that enormous biological resources are needed to supply current consumption levels. An approximate estimate for the land area required to support the current oil consumption of about 2 million cubic meters per day by the US transportation sector is of the order of 2.67 million square km which represents 29% of the total US land area, using reasonable assumptions for the efficiency of the conversion process, thus suggesting that large scale production of liquid fuels from such a biomass conversion process is impractical. Substitution of a part of the transportation fuel demand by biological materials would, however, constitute a worthwhile economic, political and environmental advance.

Biomass oil provides one of the options which are being considered as a source of synthetic petroleum substitutes for fuel uses. It may be extracted by biomass-to-liquid technology involving destructive distillation of dried biomass in a reactor at temperature of about 500° C. with subsequent cooling. Biomass oil produced by rapid pyrolysis has been produced commercially on a small scale. Pyrolysis oil is a kind of tar and normally contains high levels of oxygen which preclude it from being considered as a direct hydrocarbon substitute. It is hydrocarbon insoluble, viscous, contains upwards of 20 wt % water along with 40-50 wt % organic oxygen compounds that decrease the heating value, and is unstable because sediment is formed via e.g., phenol-formaldehyde resin forming reactions that lead to coke formation on heating. Biomass oil produced by hydrothermal liquefaction is a higher grade hydrocarbon soluble oil with only about 15 wt % oxygen-containing organic compounds. Previous attempts to commercialize this approach have failed due to the high water usage and inability to feed the biomass effectively into the processing unit.

SUMMARY OF THE INVENTION

We have now found that biomass pyrolysis oil may be effectively converted into liquid transportation fuels and other products by the well-established petroleum refinery coking processes of delayed coking and fluidized bed coking. While the limited availability of biomass and the oils derived from biomass precludes the process from addressing any large proportion of total transport energy needs, it does provide a route for using available resources efficiently and economically.

According to the present invention, a biomass pyrolysis oil is used as a co-feed for a heavy petroleum oil coking process to improve the operation of the coking process and to utilize the oil as biomaterial for the production of transportation fuels. The coking process may be a delayed coking process or a fluidized bed coking process and in each case, the presence of the biomass pyrolysis oil will decrease the coke drying time while reducing coke handling problems in the unit. In the case of a fluidized bed coking process using a gasifier for the coke such as in the Flexicoking™ process, the addition of an alkali metal salt improves the operation of the gasifier as described below.

The present invention can therefore be seen to provide a twofold improvement. According to one aspect, the operation of a heavy petroleum oil feed used in a coking process is improved by the use of the biomass oil co-feed even in minor amounts. The presence of the bio co-feed to the coker has the potential to improve the coke drying rate by the generation of free radicals from the lignin pyrolysis products in the bio oil. By improving the drying rate, fouling of the stripper section is reduced, the coke product is easier to handle and unit capacity (throughput) can be increased as cycle time decreases.

In its first aspect, therefore, the present invention provides a method of improving the operation of a heavy petroleum oil coking process in which a heavy petroleum oil feed is heated to an elevated temperature at which the feed is subject to coking, the improvement comprising co-feeding a biomass pyrolysis oil with the heavy petroleum oil feed into the coker. The coking process may be either a delayed coking process or a fluidized bed coking process such as fluid coking or Flexicoking™.

From another aspect, the use of the biomass pyrolysis oil improves utilization of biological materials and reduces the demand for crude fossil fuels. In this, its second aspect, the present invention provides a process for the conversion of biomass into liquid transportation fuel components and fuel precursors by pyrolyzing biomass at a temperature from 300 to 550° C. in a reducing atmosphere to form a biomass pyrolysis oil, blending the biomass pyrolysis oil with a heavy petroleum oil to form a feed stream for a coking process carried out at an elevated temperature.

There are significant synergies for the conversion of the bio oil in the coker which include steam conversion of oxygenated species, thermal conversion and coke disposal. These synergies, by using a coker, dramatically increase the efficiency of thermal biomass conversion operations which produce coke, tars and hydrocarbopn insoluble oils.

DETAILED DESCRIPTION

Biomass is conventionally defined as the living and recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes that can be burnt as fuel including municipal wastes, green waste (the biodegradable waste comprised of garden or park waste such as grass or flower cuttings and hedge trimmings), byproducts of farming including animal manures, food processing wastes, sewage sludge, black liquor from wood pulp or algae. It excludes organic material which has been transformed by geological processes into substances such as coal, oil shale or petroleum. Biomass is widely and typically grown from plants, including miscanthus, spurge, sunflower, switchgrass, hemp, corn (maize), poplar, willow and other trees, sugarcane, and oil palm (palm oil) with the roots, stems, leaves, seed husks and fruits all being potentially useful. The particular plant or other biomass source used is not important to the product liquid transportation fuel although the processing of the raw material for introduction to the processing unit will vary according to the needs of the unit and the form of the biomass.

Initially, the biomass is converted by pyrolysis into an oily liquid along with biomass char or coke as by-products of the pyrolysis. The biomass materials which are preferred are those which contain a higher proportion of lignins relative to celluloses and hemicelluloses since it is the lignins which, upon pyrolysis, produce greater quantities of the oils which are then treated with the liquid or supercritical water. A lignin content of at least 35 percent would produce greater amounts of the pyrolysis oil while at least 50 percent lignin would be preferred, if feasible. Since lignin plays a significant role in the carbon cycle, sequestering atmospheric carbon into the living vegetable, the use of the pyrolysis oil and its subsequent derivatives as fuels will be carbon-neutral; the celluloses and hemicelluloses produce char mostly or even exclusively. The pyrolysis of the biomass material involves heating the material in a reducing atmosphere with a limited oxygen supply, optionally with the addition of steam. In the fast pyrolysis of biomass, the material being treated is heated rapidly for only a few seconds, and this breaks it down into a large number of relatively small molecules. The resulting mixture is then cooled rapidly to prevent further reaction, giving a dark, oily liquid, known as bio oil or pyrolysis oil. Other products include char, mostly carbon solids, and a mixture of gases. Both of these can be used as fuels on site. Pyrolysis conditions will be selected according to the nature of the biomass but in general, temperatures from 300 to 500° C., typically 350 to 425° C. will normally be used; provided that the requisite conversion to the pyrolysis oil is achieved, the specific conditions used are not important.

The pyrolysis can carried out in the conventional manner with fast pyrolysis preferred for high liquid yield, characterized by rapid heating of the biomass particles and a short residence time of product vapors (0.5 to 2 s). Rapid heating implies that it is preferable for the biomass to be ground into fine particles and that the insulating char layer that forms at the surface of the reacting particles must be continuously removed.

Pyrolysis is slightly endothermic and various methods have been proposed to provide heat to the reacting biomass particles, but the preferred method is circulating fluidized beds: biomass particles are introduced into a circulating fluidized bed of hot sand or other solids. Gas, sand and biomass particles move together, with the transport gas usually being a recirculated product gas, although it may also be a combustion gas. High heat transfer rates from sand ensure rapid heating of biomass particles and ablation is stronger than with regular fluidized beds. A fast separator separates the product gases and vapors from the sand and char particles. The sand particles are reheated in fluidized burner vessel and recycled to the reactor.

Alternative methods that may be considered for use for the pyrolysis include the auger technology adapted from the Lurgi process for coal gasification, the ablative processes in which biomass particles are moved at high speed against a hot metal surface, the rotating cone process in which pre-heated hot sand and biomass particles are introduced into a rotating cone. Due to the rotation of the cone, the mixture of sand and biomass is transported across the cone surface by centrifugal force. Like other shallow transported-bed reactors relatively fine particles are required to obtain a good liquid yield although none are as practicable as the circulating fluidized bed.

Crude biomass pyrolysis liquid or bio-oil is dark brown and approximates to biomass in elemental composition. It is composed of a very complex mixture of oxygenated hydrocarbons with an appreciable proportion of water from both the original moisture and reaction product. Compositionally, the biomass pyrolysis oil will vary with the type of biomass, but is known to consist of oxygenated low molecular weight alcohols (e.g., furfuryl alcohol), aldehydes (aromatic aldehydes), ketones (furanone), phenols (methoxy phenols) and water. Solid char may also be present, suspended in the oil. The liquid is formed by rapidly quenching the intermediate products of flash degradation of hemicellulose, cellulose and lignin in the biomass. Chemically, the oil contains several hundred different chemicals in widely varying proportions, ranging from formaldehyde and acetic acid to complex high molecular weight phenols, anhydrosugars and other oligosaccharides. It has an distinctive odor from low molecular weight aldehydes and acids is acidic with a pH of 1.5-3.8 (2.8) and is an irritant.

While the biomass begins with 10% to 15% moisture, the water content of the pyrolysis oil will typically range from about 15 wt % to an upper limit of about 30-50 wt %, depending on how the oil was produced and subsequently collected. The oxygen content is 40-50%, and only low levels of sulfur may normally be detected. The lower heating value is approximately 16-21 (17.5) MJ/kg. Pour point is typically −12° C. to −33° C., with no cloud point observable until −21° C. The carbon residue is 17-23% wt (0.13% ash). Although the flash point is 40-100° C., the oil is not auto-igniting in a diesel engine. The viscosity of the bio-oil as produced can vary from as low as 25 cSt to as high as 1000 cSt.

Pyrolysis oil can tolerate the addition of some water, but there is a limit to the amount of water which can be added to the liquid before phase separation occurs. In other words, the liquid cannot be dissolved in water. It is miscible with polar solvents such as methanol, acetone, etc. and although referred to as an oil, will not mix homogeneously with hydrocarbon liquids. It can be considered as a micro-emulsion in which the continuous phase is an aqueous solution of holocellulose decomposition products that stabilize the discontinuous phase of pyrolytic lignin macro-molecules through mechanisms such as hydrogen bonding. but totally immiscible with petroleum-derived fuels. Aging or instability is believed to result from a breakdown of the emulsion structure, formation of hydrogen bonding interactions and chemical reactions of organic compounds present in the oil, e.g., phenols reacting with aldehydes to produce insoluble resin sediments.

The liquid contains many reactive species which lead to an increase in product viscosity in period of 12 months due to polymerization of these species. Pyrolysis liquids cannot be completely vaporised once they have been recovered from the vapor phase. If the liquid is heated to 100° C. or more in attempts to remove water (typically about 25% as produced) or distill off lighter fractions, it rapidly reacts and eventually produces a solid residue of around 50 wt % of the original liquid and some distillate containing volatile organic compounds and water.

Fast pyrolysis bio-oil has a higher heating value of about 17 MJkg$^{-1}$ as produced with the water that cannot readily be separated. The density of the liquid is very high at around 1.2 kg/liter compared to light fuel oil at around 0.85 kg/liter which equates to about 42% of the energy content of diesel or fuel oil on a weight basis, but 61% on a volumetric basis. Some characteristics of a typical wood-derived crude bio-oil are summarised in the table below.

| Property | Typical value |
| --- | --- |
| Moisture content | 20-30% |
| pH | 2.5 |
| Specific gravity | 1.20 |
| Elemental analysis | |
| C | 55-58% |
| H | 5.5-7.0% |
| O | 35-40% |
| N | 0-0.2% |
| Ash | 0-0.2% |
| HHV as produced | 16-19 MJ/kg |
| Viscosity (40° C., 25% water) | 40-100 cp |
| Solids (char) | 0.5% |
| Vacuum distillation residue | up to 50% |

In the present process, the biomass oil, optionally after any desired removal of the biomass char, is fed into a refinery coking process along with a heavy petroleum oil feed.

The petroleum coking process is well-established in refinery operation. There are three main variants of the coking process: delayed coking, fluid coking and its variant, the Flexicoking™ process. Delayed coking is the variant with the greatest global installed capacity while fluid coking processes (the term is used to include contact coking and Flexicoking) are becoming of greater interest with the need to maximize efficiency and utilize resources as efficiently as possible. The moving bed continuous contact coking process now appears to be obsolete.

In delayed coking, a heavy oil feed is heated in a continuously operating process furnace to effect a limited extent of thermal cracking, after which it enters a large, vertically-oriented cylindrical vessel or coking drum, in which the coking reactions take place. The term "delayed" coker refers to the fact that the coking reactions do not take place in the furnace, but rather are delayed until the oil enters the coke drum. In the coke drum, large oil molecules are further thermally cracked to form additional lighter products and residual coke, which fills the vessel. The lighter hydrocarbons flow out of the drum as vapor and are further processed into fuel products. Gradually the coke accumulates in the drum until it is almost filled with coke. When the drum is nearly filled, the hot oil from the furnace is directed to a clean coke drum, while the full one is decoked. The decoking cycle involves cooling and depressuring the drum, purging it with steam to remove residual hydrocarbon vapor, opening up the top and bottom heads (closures) on the drum and then using high pressure water lances or mechanical cutters to remove the coke from the drum. The coke falls out the bottom of the drum into a pit, where the water is drained off and conveyers take the coke to storage or rail cars. The drum is then closed up and is ready for another coking cycle. The many descriptions of the delayed coking process are too numerous to detail but useful summaries may be found in "Kirk Othmer Encyclopedia of Chemical Technology", vol. 17, John Wiley & Sons, New York, 1982, ISBN 0-471-02070-2, pp. 210-215; "Modern Petroleum Technology", Hobson (Ed.), Applied Science Publ., Barking, 1973, ISBN 085334-487-6, pp. 283-288; "Petroleum Refining, Technology and Economics", Gary and Handwerk, Marcel Dekker, NY 1994, ISBN 0-8247-9157-6 page 71; "SYDEC" Selective Yield Delayed Coking, publication of Foster Wheeler, N.J., 1995; "Tutorial: Delayed Coking Fundamentals", Ellis et al, Great Lakes Carbon Corporation, Port Arthur, Tex., prepared for presentation at the AIChE 1998 Spring National Meeting, New Orleans, La., Mar. 8-12, 1998, available online at http://www.coking.com/DECOKTUT.pdf.

A number of recent proposals have been made for increasing the capacity of delayed cokers by intentionally producing a free-flowing shot coke product; in this way, the significant proportion of coker cycle time taken in the draining and cutting operations can be eliminated so that shorter cycle times and greater throughput are achieved. These proposals may be found, for example, in U.S. Pat. Nos. 7,303,644; 7,306,713; 7,374,665, 7,645,375, 7,727,382 and 7,658,838 and in U.S. Publication Nos. U.S. 2005/0279673 and U.S. 2006/0060506.

Fluidized bed coking is a petroleum refining process in which heavy petroleum feeds, typically the non-distillable residue (resid) from fractionation, are converted to lighter, more useful products by thermal decomposition (coking) at elevated reaction temperatures, typically about 480 to 590° C., (about 900 to 1100° F.). The process is carried out in a unit with a large reactor vessel containing hot coke particles which are maintained in the fluidized condition at the required reaction temperature with steam injected at the bottom of the vessel with the average direction of movement of the coke particles being downwards through the bed. The heavy oil feed is heated to a pumpable temperature, mixed with atomizing steam, and fed through multiple feed nozzles arranged at several successive levels in the reactor. The steam is injected into a stripper section at the bottom of the reactor and passes upwards through the coke particles in the stripper as they descend from the main part of the reactor above. A part of the feed liquid coats the coke particles in the fluidized bed and subsequently decomposes into layers of solid coke and lighter products which evolve as gas or vaporized liquid. The light hydrocarbon products of the coking (thermal cracking) reactions vaporize, mix with the fluidizing steam and pass upwardly through the fluidized bed into a dilute phase zone above the dense fluidized bed of coke particles. This mixture of vaporized hydrocarbon products formed in the coking reactions continues to flow upwardly through the dilute phase with the steam at superficial velocities of about 1 to 2 meters per second (about 3 to 6 feet per second), entraining some fine solid particles of coke. Most of the entrained solids are separated from the gas phase by centrifugal force in one or more cyclone separators, and are returned to the dense fluidized bed by gravity through the cyclone diplegs. The mixture of steam and hydrocarbon vapor from the reactor is subsequently discharged from the cyclone gas outlets into a scrubber section in a plenum located above the reaction section. The heavy fraction separated in the scrubber is typically recycled to extinction by feeding back to the fluidized bed reaction zone while the lighter cracking products pass on to the product recovery section.

The Flexicoking™ process, developed by Exxon Research and Engineering Company, is, in fact, a fluidized bed coking process that is operated in a unit including a reactor and burner, often referred to as a heater in this variant of the process, as described above but also including a gasifier for gasifying the coke product by reaction with an air/steam mixture to form a low heating value fuel gas. The heater, in this case, is operated with an oxygen depleted environment. The gasifier product gas, containing entrained coke particles, is returned to the heater to provide a portion of the reactor heat requirement. A return stream of coke sent from the gasifier to the heater provides the remainder of the heat requirement. Hot coke gas leaving the heater is used to generate high-pressure steam before being processed for cleanup. The coke product is continuously removed from the reactor. In view of the similarity between the Flexicoking process and the fluid coking process, the term "fluid coking" is used in this specification to refer to and comprehend both fluid coking and Flexicoking except when a differentiation is required.

Both the fluid coking process and the Flexicoking process are well known. See, for example, "Petroleum Processing" Hengestebeck, McGraw-Hill, NY 1959, pp. 138-139; "Petroleum Processing Handbook", Bland and Davidson, McGraw-Hill, NY 1967, pp. 3-68-69; "Modern Petroleum Technology", ibid.; "Kirk Othmer Encyclopedia of Chemical Technology", ibid.

The petroleum feedstocks generally used in coking units are typically the heaviest (highest boiling) fractions of crude oil that are separated in the crude fractionation unit, normally comprising an atmospheric distillation tower and vacuum tower. The nature of the coke formed is highly dependent on the characteristics of the feedstock to the coker as well as upon the operating conditions used in the coker. Generally, the delayed coker is considered to produce three types of coke that have different values, appearances and properties. Needle coke, sponge coke, and shot coke are the most common. Needle coke is the highest quality of the three varieties which commands a premium price; upon further thermal treatment, needle coke which has high electrical conductivity (and a low coefficient of thermal expansion) is used to make the electrodes in electric arc steel production. It is low in sulfur and metals and is frequently produced from some of the higher quality coker feedstocks that include more aromatic feedstocks such as slurry and decant oils from catalytic crackers and thermal cracking tars. Typically, it is not formed by coking of resid type feeds. Sponge coke, a lower quality coke, is most often formed in refineries from lower quality refinery coker feedstocks having significant amounts of asphaltenes, heteroatoms and metals. If the sulfur and metals content is low enough, sponge coke can be used for the manufacture of anodes for the aluminum industry. If the sulfur and metals content is too high for this purpose, the coke can be used as fuel. Shot coke is considered the lowest quality coke. The term "shot coke" comes from its spherical or ovoidal shape ball-like shape, typically in the range of about 1 to about 10 mm diameter. There is also another coke, which is referred to as "transition coke" and refers to a coke having a morphology between that of sponge coke and shot coke. The fluidized bed coking processes produce a different type of coke formed of small fairly dense particles, often with an internal layered structure arising from the process of formation. Control of particle size in fluid coking is effected by the use of attrition steam injected into the lower portion of the reactor at supersonic velocity.

In the present process, the biomass pyrolysis oil is used as a co-feed with the heavy petroleum oil feed to the coking unit which may be a delayed coker or a fluidized bed coker. The bio oils produced by rapid pyrolysis (e.g. 500° C., 2 sec) are not hydrocarbon soluble, but they may have significant solubility in high asphaltene-containing vacuum resids, e.g., Maya (~40 wt % asphaltenes) and other heavy petroleum oils typically used as coking feedstocks. Maya asphaltene ring systems contain over 2 heteroatoms (N,S,O) per 4-5 ring aromatic cluster and therefore have a high solubility parameter (29.9 (MPa)$^{1/2}$; 14.51 (cal/cm$^3$)$^{1/2}$). Other heavy oils, such as those from tar sands, tar pits and pitch lakes of Canada (Athabasca, Alta.), Trinidad, Southern California (La Brea (Los Angeles), McKittrick (Bakersfield, Calif.), Carpinteria (Santa Barbara County, Calif.), Lake Bermudez (Venezuela) and similar deposits in Texas, Peru, Iran, Russia and Poland, may provide similar balances of properties. Crude oils from the tar sand belt in Venezuela, especially the Orinoco Tar Belt and the Cerro Negro part of the Belt are generally characterized by a low API gravity (low hydrogen content), typically in the range of 5-20° API and in many cases from 6 to 15° with some ranging from 8 to 12° API. Examples include the 8.5° API Cerro Negro Bitumen and crudes from the Morichal (8-8.5° API), Jobo (8-9° API), Pilon (13° API) and Temblador (19° API) oilfields. These extra-heavy oils are normally produced by conventional enhanced recovery methods including alternated steam soaking. The heaviest types of these oils such as the Morichal and Jobo crudes are normally diluted at the well-head with gasoil or lighter crudes or processed petroleum fractions such as heavy naphthas, distillates or thermal cracking products including coker gas oils and coker naphthas, in order to reduce their high viscosity and facilitate their transport by pipeline and to attain their sale specification as synthetic crudes, for instance, as the commercial blend known as the Morichal Segregatio (12.5° API) or the blend of Pilon and Temblador sold as Pilon Segregation (13.5° API) or the Pilon blend in which all the crudes produced from the region are diluted to 17° API with lighter crudes from the adjacent San Tome area.

Vacuum resids form the major proportion of heavy oil coker feeds, e.g. vac resids from crudes such as Off-shore Marlim, Bachaquero, Lloydminster/Wainwright, Maya, Cold Lake; Louisiana Sweet; Heavy Canadian; Campana. Atmospheric (long) resids may also be used as well as visbreaker bottoms, aromatic extracts, slurry oils and other heavy fractions.

The conventional practice in delayed coking is to inject steam into the furnace mainly to assist in increasing the velocity in the furnace tubes especially in the event that oil flow is momentarily is lost or decreased so as to reduce the likelihood of coking up the furnace tubes; the added steam also reduces the partial pressure of the oil in the drum so that more gas oil product is carried out of the drum. Velocity steam is typically added at around 1 wt % of the feed. Vaporization of the water content of the added biomass plus the water generated by dehydration reactions, especially from cellulose, will normally be plentiful and will generate more steam and, together with the velocity steam, is likely to lead to reactions such as rapid hydrolysis, cleavage, decarbonylation and decarboxylation of the biomass oil at the temperatures encountered in the coking process, typically about 500° C. in a delayed coker furnace or transfer line to the coke drum. In a fluidized bed coking process, the pre-heat in the scrubber section at about 345° C. prior to entry into the reactor at about 530° C. will achieve the same result. Hydroxyaromatics such as phenols and naphthols would survive this hydrothermal exposure but these would be diluted into the coker liquids generated from the resid portion of the feed and could be deoxygenated as part of the more dilute total product streams during downstream hydrotreatment, or alternatively could be extracted as phenolate salts (water soluble/hydrocarbon insoluble) using a caustic extraction process e.g. a Dualayer process with a concentrated potassium or sodium hydroxide solution containing a solubilizer extracts. Another suitable extraction process is the process using an aqueous extractant and a contactor which utilizes capillary and surface tension effects to contact the hydrocarbon phase with a lean treating solution phase in an efficient, non-dispersive manner which improves separation of the two phases. A process of this type is the Exomer$^{SM}$ process available from Merichem Chemicals and Refinery Services LLC. Mercaptans and residual carboxylic acids are also removed during this extraction step. Volatile cleaved products largely escape for recovery overhead as hydrocarbon liquids.

Any char in the pyrolysis oil produced by the pyrolysis of cellulosic components of the biomass will largely be converted to form coke, which is compatible with the coking operations, and water. Glucose which may be formed by rapid pyrolysis, e.g., 1 sec at 400° C. of cellulosic material poses no problems to the coking process.

One of the principal advantages of co-feeding biomass oil to a coking process is that the pyrolysis residues of lignin, as described above, generally form free radical initiators at a low activation energy and these initiators decrease the coke drying time in the coking process, regardless of whether it is a delayed coking process or a fluidized bed process. When the feed to the coker furnace is held as it will be according to conventional practice in delayed or fluid coking at temperatures of 425-530° C. or higher essentially all the longer alkyl chains on aromatic rings will be almost completely cleaved to form methyl aromatics and olefins. This is a rapid step with a low activation energy ($E_a$=52 Kcal/mol) and is complete in about 50 seconds at 525° C. Additional time is required for the subsequent step involving the removal of methyl groups remaining on the aromatic nuclei to form unsubstituted aromatic structures in a dry-coke-like material. This step, referred to as "sticky layer coking" requires ~58-66 Kcal/mole (log A~14) and would normally be completed after a longer residence time in a delayed coker drum or after an extended residence time (average) in the bed of a fluidized process. In either case, failure to generate a dry coke is the direct cause of difficulty in handling the coke: in the delayed coker, the sticky coke will agglomerate into a mass as in sponge coke which requires time-consuming cutting operation to remove it from the drum. If a dry shot coke can be quickly produced, as in the shot coke production methods mentioned above, the drum may be drained quickly with a consequent reduction in cycle time. In fluidized bed coking, a failure to generate a dry, particulate coke during the residence in the bed will lead to fouling problems in the stripper at the base of the reactor and also in the cyclones and the scrubber section, often leading to frequent and undesirable unit shut-downs. The generation of the free radicals from the biomass oil, however, takes place readily and assists in the rapid hydrogen transfer to the aromatic structures and the formation of a dry coke product. Unit capacity is increased from the abbreviated reaction time and product quality improved.

Since the biomass oil will normally be introduced into the coker feed stream in a minor quantity, less than 50 percent of the total feed, coking should be carried out at normal temperatures and pressures. In a delayed coker, the heavy oil feed, e.g. vacuum resid will be pumped to the furnace at a pressure of about and preferably 300 to 4000 kPa (about 44 to 580 psig), where it is heated to a temperature from about 480° C. to about 520° C. It is then discharged into the coker drum where a lower pressure prevails to allow volatiles to be removed overhead, typically from 100 to 400 kPa (about 15 to 58 psig) and preferably in the range of 100 to 300 kPa (about 15 to 44 psig). Typical operating temperatures of the drum will be between about 410° C. and 475° C. In a fluidized bed unit such as a fluid coker or a Flexicoker, the feed will typically be heated to a temperature at which it is pumpable before passing through the scrubber section to pick up heat from the cracked vapors. The pre-heated feed is then brought to coking temperatures typically in the range of 480 to 565° C. with reactor pressures being almost atmospheric in order to facilitate removal of hydrocarbon volatiles and coke drying.

As mentioned above, the biomass pyrolysis oil will normally constitute a minor proportion of the coker feed and in most cases will not exceed about 20 percent of the total feed, more typically 10 percent. In delayed coking the biomass oil may be blended in with the petroleum oil feed component upstream or immediately downstream of the combination tower or, alternatively, into the transfer line between the furnace and the coke drum, which is preferred. In fluidized bed coking, the biomass may be added directly to the feed line to the scrubber section of the reactor in which it is pre-heated prior to entry into the reactor itself.

When the biomass oil is used as a co-feed in the Flexicoker process where a portion of the coke product is gasified to provide process heat and fuel gas, it is advantageous to include an alkali metal compound in the feed. This compound becomes incorporated in the coke particles in the reactor and when this coke is sent to the gasifier, promotes the gasification in the manner described in U.S. Pat. No. 3,689,240 (Aldridge). The preferred alkali metal compounds are the salts of which potassium carbonate $K_2CO_3$ and cesium carbonate $Cs_2CO_3$ are preferred. A mixture of two or more compounds may be used. Alkali metal salts such as the sodium, lithium, rubidium salts may be used either alone or in combination with one another and the preferred alkali metal salt anions include, for example, carbonates, acetates, formates. Oxides and hydroxides of alkali metals may also be used. Preferred catalyst salt compositions would include mixtures of $K_2CO_3$ and KCl, $Cs_2CO_3$ and CsCl, $K_2CO_3$ and $Li_2CO_3$ or $Cs_2CO_3$ and $Li_2CO_3$, although any catalytically-active mixture of alkali metal salt compounds which are stable under reaction conditions may be used. The salt(s) may be supported on an inert base, such as alpha or gamma alumina, silica, zirconia, magnesia, mullite or supported by a synthetically prepared or naturally occurring material, such as pumice, clay, kieselguhr, diatomaceous earth or bauxite. The most preferred supported catalysts would be either $K_2CO_3$ or $Cs_2CO_3$ supported on an alumina base.

In the gasifier, steam is injected into the fluidized coke bed. The coke is gasified by reaction with steam and CO. There is some methane production associated with this process, but it is a relatively minor reaction. The final gas product contains only about 2 mol % methane. The primary products of the gasification reactions are CO and $H_2$. The resultant gaseous stream contains more than about 20 mole percent CO (dry basis) and about 20 mole percent or less $H_2$ (dry basis). In order to produce the gaseous stream with the above-described composition, the rate of steam injection into the reaction zone, the temperature of the reaction zone and the pressure of the reaction zone should optimally be maintained within certain ranges, typically as tabulated below.

|  | Broad | Preferred | More Preferred |
|---|---|---|---|
| Steam to air rate, molar ratio basis | 0.05-1.0 | 0.1-0.5 | 0.1-0.4 |
| Temperature, C. | 700-1200 | 800-1100 | 850-1000 |
| Pressure, kPa | 0-1000 | 50-700 | 50-350 |

The pressures indicated in the above table are indicative of the pressures associated with the FLEXICOKING process. The pressures associated with partial oxidation or PDX operations are typically higher.

Another advantage of using the alkali metal compound in delayed coking is that the addition of the compound(s) to feeds containing very heavy oils such as those from tar sands and the Orinoco Heavy Oil Belt which would normally produce a dense coke product which is difficult to remove from the drum and which is likely to inflame in the coke pit when discharged. The coke product resulting from the use of alkali metal compound additive is notable for its lower density and higher porosity relative to the dense coke product which would be obtained in the absence of the additive; moreover, it is more friable and usually is in compact, granular form permitting it to be discharged from the drum without difficulty. The lower density coke is more amenable to uniform quenching in the drum and so can be cut and discharged with a reduced risk of eruptions and a reduced risk of fires in the coke pit or when the coke is subsequently handled and transported. The improvement provided by the addition of alkali metal compounds to such heavy oil feeds is described in co-pending U.S. patent application Ser. No. 12/828,405, filed on Jul. 1, 2010, which claims priority to U.S. Provisional Patent Application No. 61/270,595, filed on Jul. 10, 2009, to which reference is made for details of the preferred alkali metal compounds and their manner of use in delayed coking with heavy oil feeds.

The invention claimed is:

1. A method of improving the operation of a heavy petroleum oil coking process in which a heavy petroleum oil feed is heated to an elevated temperature at which the feed is subject to coking, the improvement comprising co-feeding a biomass pyrolysis oil with the heavy petroleum oil feed into the coker.

2. A process according to claim 1 in which the coking process is a delayed coking process.

3. A process according to claim 1 in which the coking process is a fluidized bed coking process.

4. A process according to claim 1 in which the biomass pyrolysis oil is produced by the pyrolysis of biomass comprising plant matter, biodegradable wastes, byproducts of farming, food processing wastes, sewage sludge, black liquor from wood pulp or algae.

5. A process according to claim 4 in which the pyrolysis oil is produced by the pyrolysis of biomass comprising the roots, stems, leaves, seed husks and fruits of miscanthus, spurge, sunflower, switchgrass, hemp, corn (maize), poplar, willow, sugarcane, and oil palm (palm oil).

6. A process according to claim 1 in which the pyrolysis oil is produced by the pyrolysis of biomass at a temperature of 350 to 425° C.

7. A process according to claim 1 in which the biomass pyrolysis oil comprises an emulsion of 15-50 wt % non-separable water content.

8. A process according to claim 1 in which the biomass pyrolysis oil comprises an emulsion having an oxygen content of 40-50%.

9. A process according to claim 1 in which the heavy petroleum oil feed is heated to a temperature of at least 480 C.

10. A process according to claim 1 in which the biomass pyrolysis oil comprises up to 20 weight percent of the total feed to the coking process.

11. A process for the conversion of biomass into liquid transportation fuels which comprises:

(i) pyrolyzing biomass at a temperature from 300 to 500° C. in a reducing atmosphere to form a biomass pyrolysis oil and
(ii) mixing the biomass pyrolysis oil with a heavy petroleum oil to form a feed stream,
(iii) heating the feed stream to an elevated temperature at which the feed stream is subject to coking and coking the feed stream to form a coke product.

12. A process according to claim 11 in which the coking process is a delayed coking process.

13. A process according to claim 11 in which the coking process is a fluidized bed coking process.

14. A process according to claim 13 in which the coking process is a fluidized bed coking process in which the feed stream is heated to a temperature of 250 to 350° C. at a pressure of 300 to 4000 kPa after which the heated stream is discharged into a fluidized bed coking reactor at a pressure of 100 to 400 kPa and a temperature of 450 to 500° C.

15. A process according to claim 13 in which the coking process is a fluidized bed coking process in which an alkali metal salt is added to the feed stream.

16. A process according to claim 11 in which the pyrolysis oil is produced by the pyrolysis of biomass comprising the roots, stems, leaves, seed husks and fruits of miscanthus, spurge, sunflower, switchgrass, hemp, corn (maize), poplar, willow, sugarcane, and oil palm (palm oil).

17. A process according to claim 11 in which the pyrolysis oil is produced by the pyrolysis of biomass at a temperature of 350 to 425° C.

18. A process according to claim 11 in which the biomass pyrolysis oil comprises an emulsion of 15-50 wt % non-separable water content and an oxygen content of 40-50%.

19. A process according to claim 11 in which the coking process is a delayed coking process in which the feed stream is heated to a temperature of 480 to 520° C. at a pressure of 300 to 4000 kPa after which the heated stream is discharged into a delayed coker drum at a pressure of 100 to 400 kPa and a temperature of 410 to 475° C.

20. A process according to claim 11 in which the biomass pyrolysis oil comprises up to 20 weight percent of the total feed to the coking process.

* * * * *